(12) United States Patent
Pimort

(10) Patent No.: US 7,652,561 B2
(45) Date of Patent: Jan. 26, 2010

(54) METHOD FOR MONITORING A TIRE, TIRE THEREFORE, AND USE THEREOF

(75) Inventor: Bertrand Pimort, Moissat (FR)

(73) Assignee: Michelin Recherche et Technique S.A., Granges-Paccot (CH)

( * ) Notice: Subject to any disclaimer, the term of this patent is extended or adjusted under 35 U.S.C. 154(b) by 492 days.

(21) Appl. No.: 11/579,641

(22) PCT Filed: Apr. 28, 2005

(86) PCT No.: PCT/EP2005/004567

§ 371 (c)(1),
(2), (4) Date: Nov. 6, 2006

(87) PCT Pub. No.: WO2005/105481

PCT Pub. Date: Nov. 10, 2005

(65) Prior Publication Data

US 2007/0241871 A1    Oct. 18, 2007

(30) Foreign Application Priority Data

May 4, 2004    (FR)    .................................. 04 04862

(51) Int. Cl.
*B60Q 1/00*   (2006.01)
*B60C 23/00*  (2006.01)
*G08B 1/08*   (2006.01)
*G08B 13/14*  (2006.01)

(52) U.S. Cl. ...................... 340/438; 340/442; 340/443; 340/444; 340/445; 340/447; 340/539.1; 340/572.1

(58) Field of Classification Search .................. None
See application file for complete search history.

(56) References Cited

U.S. PATENT DOCUMENTS

| 6,087,930 | A | * | 7/2000 | Kulka et al. ................. 340/447 |
| 7,023,334 | B2 | * | 4/2006 | Fischer et al. ............... 340/444 |
| 7,237,433 | B2 | * | 7/2007 | Walenty et al. ............. 73/146.5 |
| 2002/0126005 | A1 | * | 9/2002 | Hardman et al. ............ 340/442 |
| 2003/0006890 | A1 | * | 1/2003 | Magiawala et al. ......... 340/438 |
| 2003/0076222 | A1 | * | 4/2003 | Fischer et al. ............... 340/442 |
| 2003/0098787 | A1 | * | 5/2003 | Lin ............................ 340/442 |
| 2003/0227380 | A1 | * | 12/2003 | Piech et al. ................. 340/443 |
| 2007/0146124 | A1 | * | 6/2007 | Shinmura .................... 340/447 |
| 2007/0222568 | A1 | * | 9/2007 | Morar et al. ................ 340/447 |

FOREIGN PATENT DOCUMENTS

DE    195 22 269 A    1/1997    * cited by examiner

*Primary Examiner*—Julie Lieu
(74) *Attorney, Agent, or Firm*—Cohen Pontani Lieberman & Pavane LLP

(57) ABSTRACT

A process for monitoring a tire (11 to 14) mounted on a land vehicle (VH), the process being implemented by means of a central control unit (UC) and an electronic chip ($21g$ to $24g$) implanted in a sidewall of the tire. A tire is provided with two chips ($21g$ to $24g$, $21d$ to $24d$) implanted in its respective sidewalls, but only one of them is operational during use depending on the mounting direction of the tire. The chips of the same tire contain a given tire identification code (K11 to K14) and specific respective codes (Kg, Kd) that indicate their implantation in the tire. The process is implemented by compiling and/or updating, both in the central unit (UC) and in the operational chip ($21g$, $22d$, $23g$, $24d$), historical records of the use of the tire by memorising updated values of evolutive parameters of the use of the tire, such as the number of kilometers (DIST) it has covered or its highest running speed (VMAX).

12 Claims, 2 Drawing Sheets

US 7,652,561 B2

METHOD FOR MONITORING A TIRE, TIRE THEREFORE, AND USE THEREOF

RELATED APPLICATION

This is a U.S. National Phase Application under 35 USC 371 of International Application PCT/EP2005/004567, filed on Apr. 28, 2005.

FIELD OF THE INVENTION

In a general sense the invention pertains to the safety of land vehicles and in particular automobiles.

More precisely, a first aspect of the invention concerns a process for monitoring a tire fitted on a land vehicle provided with a central control unit, said process comprising a preliminary stage that consists at least in implanting in a sidewall of a tire an electronic chip in which at least a tire identification code is memorised, and equipping this chip and the central unit with respective peripheral and central communication circuits connected to one another via a data transmission path not involving physical contact, and a functional stage comprising at least a monitoring operation that consists in compiling and/or updating a historical record of the use of the tire by memorising updated values centralised by the central unit and representative of at least one evolutive parameter of the use of the tire, such as the number of kilometres it has covered or its highest rolling speed.

BACKGROUND OF THE INVENTION

A method of this type is already implemented in existing automobiles and considerably enhances their safety by ensuring constant monitoring of the conditions of use of the tires on such vehicles.

Nevertheless, at present this monitoring can only be ensured completely provided that the tires on the vehicle are not replaced, nor their position on the vehicle changed, whether by changing a wheel or by rotation through a half-turn about a vertical axis.

In effect, the monitoring of tire use in its known form is disturbed whenever, after a tire burst, the vehicle runs on with its spare wheel until the burst tire has been repaired, or whenever tires suitable for temperate tire conditions are replaced by snow tires or conversely, or when the tires are inverted or swapped around to ensure symmetrical wear, or even when worn tires are replaced by new ones.

SUMMARY OF THE INVENTION

One object of the invention is to provide a method which overcomes at least one of the above-described problems.

This and other objects are attained in accordance with one aspect of the present invention directed to a process for monitoring a tire fitted on a land vehicle provided with a central control unit. The process includes a preliminary stage that comprises implanting in a sidewall of the tire an electronic chip in which is memorised at least an identification code which identifies the tire, and providing said chip and the central unit with respectively peripheral and central communication circuits connected to one another via a data transmission path involving no physical contact. The process also includes a functional stage comprising a monitoring operation that includes compiling and updating a historic record of the use of the tire by memorising updated values centralized by the control unit, such values representing at least one evolutive parameter of the use of the tire such as the number of kilometres it has covered or its highest running speed. The preliminary stage includes implantation in the first and second sidewalls of the tire of first and second electronic chips, only one of which is operational during use, in each of which is memorised the same tire identification code, and in which are respectively memorised different respective implantation codes of the said chips in the tire. These first and second chips are provided respectively with first and second peripheral communication circuits of which only the communication circuit of the operational chip can be used during the use of the tire to communicate with the central communication circuit. The functional stage comprises centralized and decentralized monitoring operations including respectively compiling and/or updating, in the central unit and in the operational chip, simultaneously active centralized and decentralized historical records dedicated to the tire identified by the identification code memorised in the operational chip, and to a mounting situation of the tire identified by the implantation code memorised in the said operational chip.

Preferably, before the implementation of the centralised and decentralised monitoring operations, the functional stage comprises a first verification operation that generates a first decision result if the active centralised historical record is dedicated to the tire identified by the identification code memorised in the operational chip, and a second decision result in the opposite case.

Advantageously, the functional stage also comprises a search operation which is conditionally implemented on production of the second decision result, which consists in searching the central unit for any non-active centralised historical record previously memorised and dedicated to the tire identified by the identification code memorised in the operational chip and, if this search proves fruitful, generating a third decision result that consists at least in activating the memorised central historical record, or generating a fourth decision result if the search does not prove fruitful.

Before the centralised and decentralised monitoring operations are implemented, the functional stage can also comprise a second verification operation that generates a fifth decision result if the active centralised historical record is dedicated to the tire identified by the identification code memorised in the operational chip, but is not dedicated to the mounting situation identified by the implantation code memorised in the said operational chip.

In this case it is useful to provide that the functional stage comprises a supplementing operation which is conditionally implemented when the fifth decision result is generated and during which any recorded element that may be missing from the active decentralised historical record and available in the active centralised historical record dedicated to the same tire is recopied from the said active centralised record to the active decentralised record.

When the monitoring process generates the fourth decision result, the centralised monitoring operation that follows this fourth decision result comprises, for example, the creation of a new active centralised historical record dedicated to the tire identified by the tire identification code memorised in the operational chip, and to the mounting situation identified by the implantation code memorised in the same operational chip, and any record that may be missing from the newly created active centralised historical record and is available in the active decentralised record is recopied from this decentralised record into the newly created active centralised record.

In practice, each verification operation is advantageously carried out each time the vehicle is started.

The process of the invention is in particular of greatest advantage when applied for monitoring the rolling conditions of a tire used in a degraded mode, for example an under-inflated tire or even a totally deflated tire.

The invention also concerns a tire for implementing the monitoring process defined above, this tire being characterised in that it comprises, at least, first and second electronic chips implanted respectively in a first and a second sidewall of the tire.

Other characteristics and advantages of the invention will emerge clearly from the description, presented below for indicative and in no way limiting purposes, with reference to the attached figures wherein:

DETAILED DESCRIPTION OF THE DRAWINGS

Figure 1:
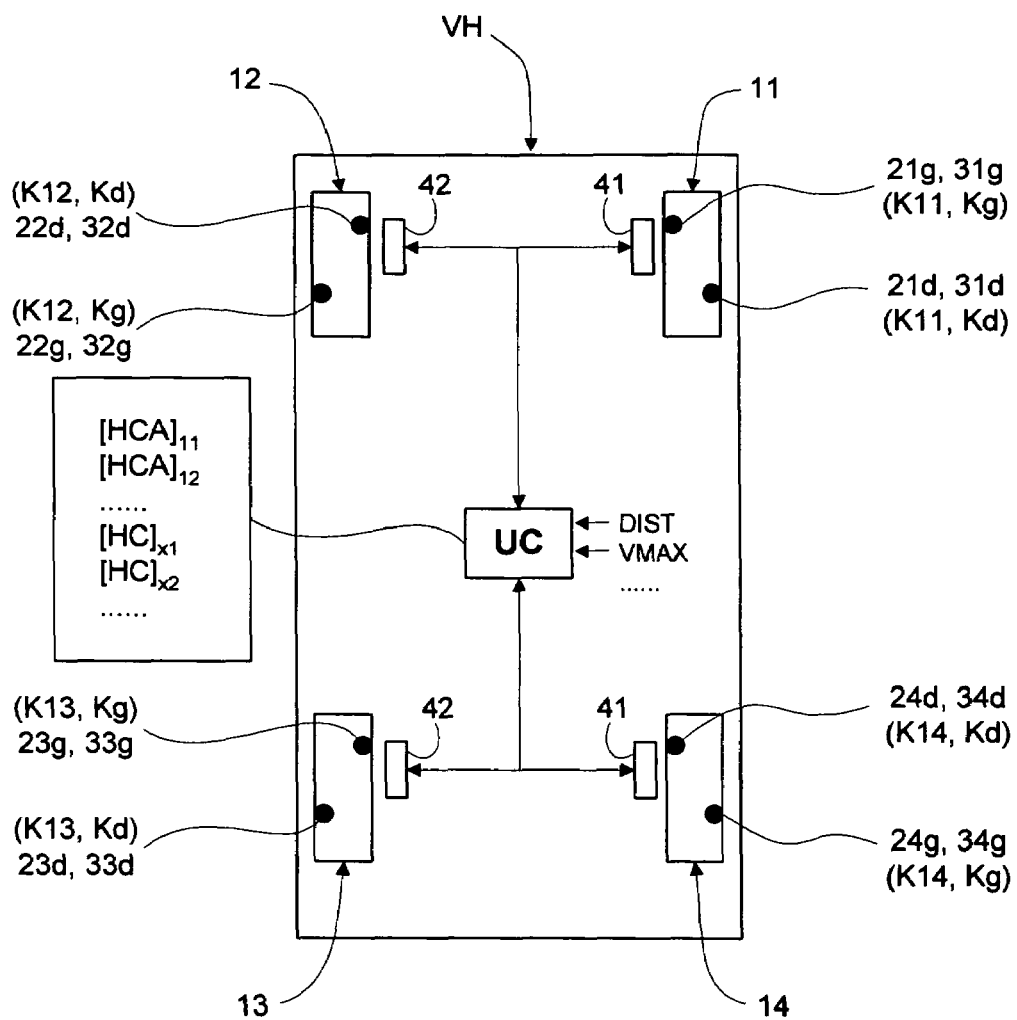
FIG. 1 is a schematic view of a vehicle in which the process of the invention is implemented.
Figure 2:
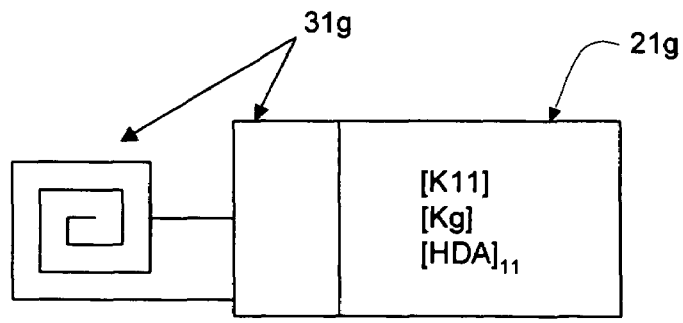
FIG. 2 is a schematic representation of an electronic chip and its communication circuit, as used in the process of the invention.

As mentioned earlier, the invention concerns a process for monitoring a tire, and in practice each of the tires 11 to 14, of a land vehicle VH provided with a central control unit UC.

Thus, the invention is applicable in particular to automobile vehicles of recent design, which are all equipped with such a control unit UC.

In a manner known as such, the central unit UC is provided with a central communication circuit such as 41 to 44 for each respective tire 11 to 14.

Each of the tires 11 to 14 carries a corresponding electronic chip 21g to 24g implanted in one sidewall of the tire, and in which is memorised a tire identification code such as K11 to K14.

Besides, each chip such as 21g to 24g has a peripheral communication circuit such as 31g to 34g, each of these peripheral communication circuits being connected to the corresponding central communication circuit such as 41 to 44 via a data transmission path involving no physical contact.

In practice, each chip and its associated peripheral communication circuit are constituted by an electronic tag, and data are transmitted by a radio link.

The electronic tags, also known as "radio tags", "intelligent tags" or "smart cards", the latter being the Anglo-Saxon expression equivalent to "intelligent tags", are also well known to those familiar with the subject under the English acronym RFID (for "Radio Frequency Identification") to enable identification by radio frequency.

Also in a known manner, the process of the invention comprises a functional stage which at least implements a monitoring operation.

In practice, for each tire this monitoring operation enables a memorised trace of the conditions of use of the tire to be kept, i.e. certain measured values taken by one or more physical and evolutive parameters of the use of the tire such as the number of kilometres DIST it has covered, its highest running speed VMAX, its minimum pressure, etc.

Thus, for each tire the monitoring process consists in compiling and/or updating a historical record of the use of the tire by memorising updated values of that or those parameter(s) of the use of the tire, the said values generally received by the central unit UC from various sensors on the vehicle VH or calculated by the central unit from data linked to those parameters.

The invention is implemented by virtue of tires such as 11 to 14 each of which comprises two electronic chips, each chip being implanted in a corresponding sidewall of the tire.

Thus, the chips 21g and 21d are respectively implanted in the initially left and right sidewall of tire 11, the chips 22g and 22d are respectively implanted in the left and right sidewalls of tire 12, the chips 23g and 23d are respectively implanted in the left and right sidewalls of tire 13 and the chips 24g and 24d are respectively implanted in the left and right sidewalls of tire 14.

However, bearing in mind that the central communication circuits 41 to 44 are located on the vehicle, for example, towards its inside as illustrated in FIG. 1, only those chips can communicate with the central unit UC which are implanted in the inward-facing sidewalls of the tires 11 to 14, i.e. those whose respective communication circuits are within range of the central communication circuits.

In other words only the chips 21g, 22d, 23g and 24d are operational during use in the configuration illustrated in FIG. 1.

In each chip carried by a given tire an identification code of that tire is memorised.

For example, the chips 21g and 21d in tire 11 contain a code K11 that identifies tire 11, the chips 22g and 22d in tire 12 contain a code K12 that identifies tire 12, the chips 23g and 23d in tire 13 contain a code K13 that identifies tire 13 and the chips 24g and 24d in tire 14 contain a code K14 that identifies tire 14.

Besides, in each chip an implantation code of that chip in the tire carrying it is memorised.

Thus, the chips 21g, 22g, 23g and 24g implanted in the respective left sidewalls of tires 11 to 14 contain an implantation code Kg, while the chips 21d, 22d, 23d and 24d implanted in the respective right sidewalls of the tires 11 to 14 contain an implantation code Kd.

Inspection of FIG. 1 shows that this arrangement enables the manner in which each tire is mounted on the vehicle VH to be identified completely.

For example, it can be noted that tire 11 is mounted so that its operational chip 21g is the one implanted in its left sidewall, while tire 14 is mounted so that its operational chip 24d is the one implanted in its right sidewall, meaning that the latter tire has been turned round so as to invert its right and left sidewalls.

Under these conditions the functional stage of the process according to the invention comprises, for each tire, a centralised monitoring operation, called MAJOURC, and a decentralised monitoring operation, called MAJOURD.

The centralised monitoring operation MAJOURC consists, for each tire, in compiling and/or updating in the central unit UC an active centralised historical record HCA of the use of that tire, and the decentralised monitoring operation MAJOURD consists in compiling and/or updating, in the operational chip of that tire, an active decentralised historical record of the use of the same tire.

However, since the structure chosen makes it possible to distinguish between the different mounting situations of each tire, each active centralised historical record HCA and the corresponding active decentralised record HDA are simultaneously dedicated to the tire identified by the tire identification code memorised in the operational chip in which the historical record HDA is kept up to date, and to the mounting situation of the tire identified by the implantation code memorised in the same operational chip.

For example, the active centralised historical record [HCA] 11 relating to tire 11 defined a priori as fitted on the front right wheel, and the corresponding active decentralised record [HDA]11, are simultaneously dedicated to tire 11 as identified by the identification code K11 memorised in the operational chip that co-operates with the front right central communication circuit 41, i.e. in the chip 21g, and to the mounting situation of that tire identified by the implantation code Kg memorised in the same operational chip 21g.

Figure 3:
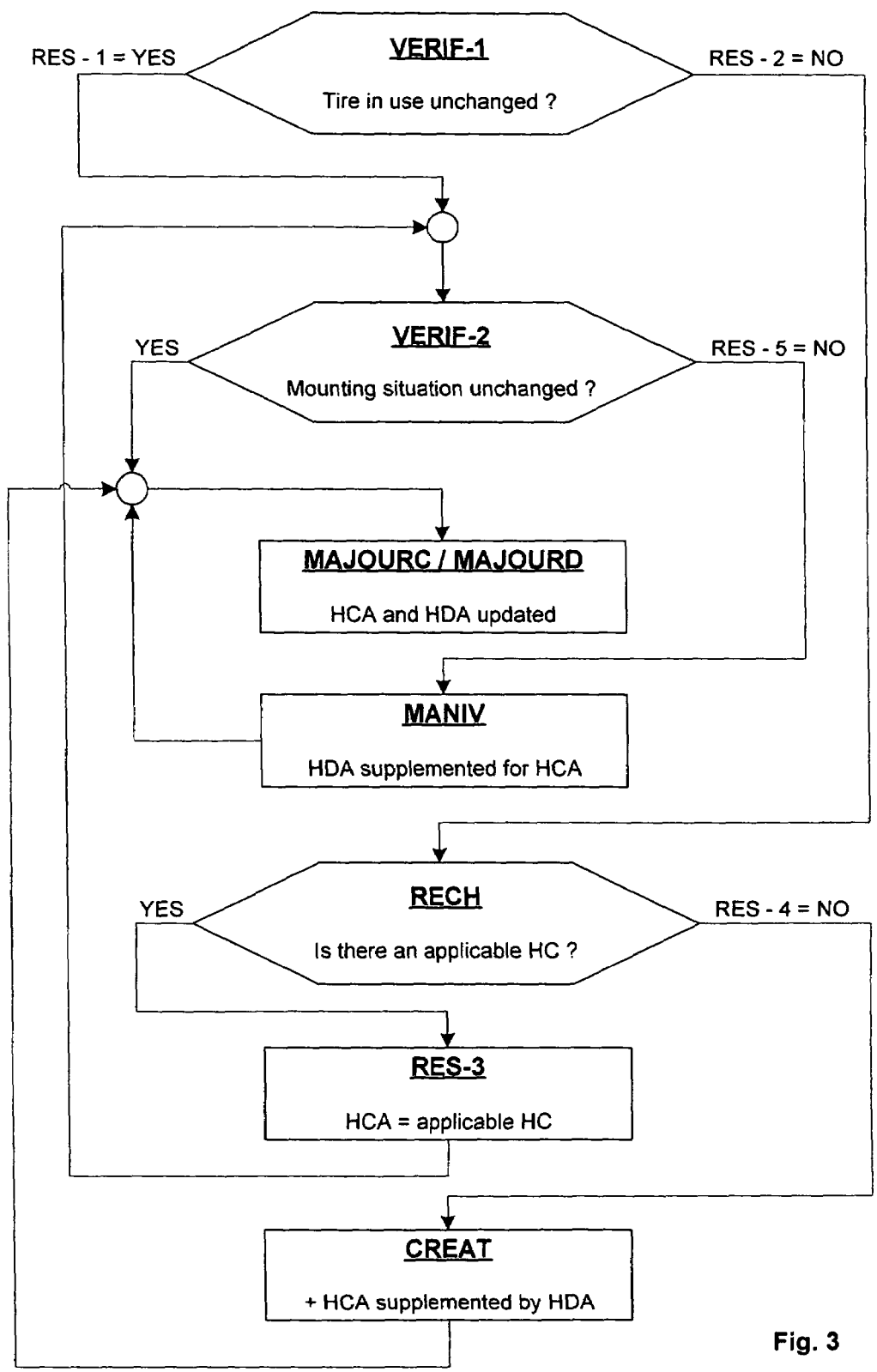
FIG. 3 is an operational flow chart illustrating the implementation of the process of the invention

The operational details of the process are illustrated in FIG. 3 and will be explained below with reference to tire 11 taken as an example.

Before the centralised and decentralised monitoring operations MAJOURC and MAJOURD for the tire are implemented, the process comprises a first verification operation VERIF_1 which is initiated for example each time the vehicle VH is started and which enables verification that the tire 11 has not been taken off the front right wheel and mounted on any other wheel while the vehicle was stopped, has not been turned about itself by inverting its right and left sidewalls while remaining on the same wheel, or has not been removed entirely.

This VERIF_1 operation generates a first decision result RES_1 if the active centralised historical record HCA as it was before the vehicle VH stopped is effectively dedicated, as it should be in the absence of any change, to the tire identified by the identification code memorised in the operational chip 21g and transmitted to the central unit UC when the vehicle VH is started again, i.e. to the tire 11, and a second decision results RES_2 is generated in the contrary case.

The production of the result RES_1 indicates that the tire 11 which was on the front right wheel before the vehicle stopped is still on the front right wheel, but does not exclude the possibility that the right and left sidewalls of the tire have been inverted.

In contrast, the production of the result RES_2 indicates that the tire 11 which was on the right front wheel before the vehicle stopped is no longer on the right front wheel, but does not exclude the possibility that the said tire has been fitted on another wheel, nor that the new tire has not already been used before on the vehicle and is therefore associated with an archived centralised historical record available in the memory of the central unit UC.

If the result RES_1 is produced, the process of the invention carries out a second verification operation VERIF_2 to check whether or not the tire 11, which was on the front right wheel before the vehicle stopped and which is still on that right front wheel, has had its right and left sidewalls inverted.

Granted that such an inversion would necessarily bring about a change of the operational chip of the tire, the second verification operation VERIF_2 checks whether the active centralised historical record HCA as it was before the vehicle VH stopped is effectively dedicated, as it should be in the absence of a change, to the mounting situation identified by the implantation code Kg memorised in the operational chip 21g and transmitted to the central unit UC since the vehicle VH was restarted.

If not, the verification operation VERIF_2 generates a fifth decision result RES_5 indicating that the tire 11, although still on the front right wheel, has had its right and left sidewalls inverted while the vehicle was stopped.

In the absence of any change, i.e. when the verification operation VERIF_1 and VERIF_2 have not produced either of the results RES_2 and RES_5, the updated values of the utilisation parameters of the tire 11, received and/or processed by the central unit UC, are used to enrich the historical records HCA and HDA.

In case the verification operation VERIF_2 has led to the decision result RES_5 indicating that the tire 11 has been inverted, the process carries out a supplementing operation MANIV whereby any recorded element that may be missing from the active decentralised historical record HDA and is available in the active centralised historical record HCA dedicated to the same tire, is recopied from the active centralised historical record HCA into the active decentralised historical record HDA.

In case the verification operation VERIF_1 has led to the decision result RES_2 indicating that the tire 11 mounted on the front right wheel before the vehicle stopped has been replaced by another tire, the process carries out a search operation RECH which consists in searching the central unit UC for any centralised historical record HC which, although not active, has previously been memorised in the central unit UC and is dedicated to the tire identified by the identification code memorised in the new operational chip.

If this search, carried out among historical records such as [HC]×1, [HC]×2, etc. proves fruitful, the process generates a third decision result RES_3 which consists at least in activating this memorised historical record HC relating to a tire already used previously on the vehicle and now brought back into service while the vehicle was last stopped.

If the search does not prove fruitful, the process generates a fourth decision result RES_4 indicating that the tire newly mounted on the front right wheel is being used on the vehicle for the first time.

In that case the process of the invention implements the creation CREAT of a new active centralised historical record HCA dedicated to the tire identified by the identification code memorised in the new operational chip, and to the mounting situation identified by the implantation code, such as Kg or Kd, memorised in the same operational chip.

If in addition the tire newly brought into service for the first time on the vehicle during its last stop is not a new tire, and if this tire consequently already has an active decentralised historical record HDA, all the data available in that record HDA and required by the active centralised historical record HCA are recopied from the decentralised record HDA in to the newly created active centralised historical record HCA.

The process of the invention is in particular most advantageous when applied for monitoring the running conditions of a tire used in a degraded mode, for example an under-inflated or even totally deflated tire.

The invention claimed is:

1. A process for monitoring a tire fitted on a land vehicle (VH) provided with a central control unit (UC), comprising:
  a preliminary stage that comprises implanting in a sidewall of the tire an electronic chip in which is memorized at least an identification code which identifies the tire, and providing said chip and the central unit (UC) with respectively peripheral and central communication circuits connected to one another via a data transmission path involving no physical contact; and
  a functional stage comprising a monitoring operation that includes compiling and updating a historic record of the use of the tire by memorizing updated values centralized by the control unit (UC), such values representing at least one evolutive parameter of the use of the tire
  wherein the preliminary stage comprises implanting in first and second sidewalls of the tire respective first and second electronic chips only one of which is operational during use, in each of which is memorized the same tire identification code and in which are respectively memorized different respective implantation codes of said chips in the tire, these first and second chips being respectively provided with first and second peripheral communication circuits of which only the communication circuit of the operational chip can be used during operation to communicate with the central communication circuit, and wherein the functional stage comprises centralized and decentralized monitoring operations (MAJOURC, MAJOURD) that include, respectively, compiling and/or updating, in the central unit (UC) and in the operational chip, active centralized and decentralized historical records (HCA, HDA) simultaneously dedicated to the tire identified by the identification code memorized in the operational chip and to a mounting situation of the tire identified by the implantation code memorized in the said operational chip.

2. The monitoring process according to claim 1, wherein before the centralized and decentralized monitoring operations (MAJOURC, MAJOURD) are implemented, the functional stage comprises a first verification operation (VERIF_1) that generates a first decision result (RES_1) if the active centralized historical record (HAC) is dedicated to the tire identified by the identification code memorized in the operational chip, and a second decision result (RES_2) if it is not.

3. The monitoring process according to claim 2, wherein the functional stage comprises a search operation (RECH) which is conditionally carried out if the second decision result (RES_2) is produced, and which includes searching the central unit (UC) for any non-active historical record (HC) previously memorized and dedicated to the tire identified by the identification code memorized in the operational chip, and if this search proves fruitful, generating a third decision result (RES_3) that includes activating the memorized historical record (HC), or if the search proves unfruitful, generating a fourth decision result (RES_4).

4. The monitoring process according to claim 1, wherein before the centralized and decentralized monitoring operations (MAJOURC, MAJOURD) are implemented, the functional stage comprises a second verification operation (VERIF_2) which generates a fifth decision result (RES_5) if the active centralized historical record (HCA) is dedicated to the tire identified by the identification code memorized in the operational chip but is not dedicated to the mounting situation identified by the implantation code memorized in the said operational chip.

5. The monitoring process according to claim 4, wherein the functional stage comprises a supplementing operation (MANIV) conditionally carried out if the fifth decision result (RES_5) has been generated, and during which any recorded element possibly missing from the active decentralized historical record (HDA) and available in the active centralized historical record (HCA) dedicated to the same tire is recopied from the said active centralized record (HCA) into the said active decentralized record (HDA).

6. The monitoring process according to claim 1, wherein the functional stage comprises a search operation (RECH) which is conditionally carried out if the second decision result (RES_2) is produced, and which includes searching the central unit (UC) for any non-active historical record (HC) previously memorized and dedicated to the tire identified by the identification code memorized in the operational chip, and if this search proves fruitful, generating a third decision result (RES_3) that includes activating the said memorized historical record (HC), or if the search proves unfruitful, generating a fourth decision result (RES_4);

wherein the centralized monitoring operation that follows the generation of the fourth decision result (RES_4) comprises the creation (CREAT) of a new active centralized historical record (HCA) dedicated to the tire identified by the identification code memorized in the operational chip, and to the mounting situation identified by the implantation code memorized in said operational chip, and wherein any recorded element possibly missing from the newly created active centralized historical record (HCA) and available in the active decentralized historical record (HDA) is recopied from the said active decentralized record (HDA) into the newly created active centralized record (HCA).

7. The monitoring process according to claim 2, wherein the first verification operation is carried out at least each time the vehicle (VH) is started.

8. A tire for implementing the monitoring process according to claim 1, wherein the tire comprises at least first and second electronic chips respectively implanted in first and second sidewalls of the tire.

9. The monitoring process according to claim 1, comprising the step of monitoring the running conditions of a tire used in a degraded mode.

10. The monitoring process according to claim 4, wherein the second verification operation is carried out at least each time the vehicle (VH) is started.

11. The monitoring process according to claim 1, wherein the evolutive parameter of the use of the tire is the number of kilometers it has covered (DIST).

12. The monitoring process according to claim 1, wherein the evolutive parameter of the use of the tire is the tire's highest running speed (VMAX).

* * * * *